UNITED STATES PATENT OFFICE.

EDWARD R. BARROW, OF MEMPHIS, TENNESSEE.

PROCESS FOR STERILIZING AND PRESERVING GRAIN.

1,165,220. Specification of Letters Patent. Patented Dec. 21, 1915.

No Drawing. Application filed November 16, 1914. Serial No. 872,450.

*To all whom it may concern:*

Be it known that I, EDWARD R. BARROW, a citizen of the United States, residing at Memphis, in the county of Shelby and State of Tennessee, have invented certain new and useful Improvements in Processes for Sterilizing and Preserving Grain; and I do hereby declare the following to be a full, clear, and exact description of the invention, such as will enable others skilled in the art to which it appertains to make and use the same.

My present invention relates to an improved method of treating grain in order to prevent the same from deterioration due to the organic changes incident to heating or sprouting, or both.

It is well known that the same kind of grain differs from year to year in the quantity of water contained therein, and in various other factors which tend to contribute to the deterioration of the grain; and if it is subjected to external heat, as when stored in railway cars, grain elevators, or more especially in the holds of ships, it tends to sprout or ferment, causing organic changes in the grain which will largely impair, if not wholly destroy, its value as a food product.

As described and claimed in my Patent #1,119,672, granted December 1, 1914, and entitled Process for sterilizing and preserving cotton seed, I have found that, by treating cotton seed with the hulls on with ordinary sodium chlorid, the germinating power of the seed is destroyed and the seed is maintained for long periods in a sound and unimpaired condition, and is completely sterilized. My present invention is intended to cover the same process as applied to the treatment of grains, such as wheat, corn, oats, rye, barley, or rough rice, meaning by the latter term rice with the hulls on.

According to my invention the salt is applied in the pulverized dry form, being intimately mixed with the grain. The moisture of the grain and of the air will cause the salt to permeate the surface of the grain to a limited depth, and will not only serve as an antiseptic to prevent the growth of germs on the surface of the grain, but will also actually sterilize the grain and prevent it from sprouting.

Preferably about 5% by weight of the pulverized salt is thoroughly mixed with about 95% by weight of the grain, both being in the dry state, but the relative proportions of the grain and the salt may be varied at will.

The minute quantity of salt that passes through the surface of the grain and permeates the body thereof will not be sufficient to impair the edibility of the grain, or the general uses for which the grain is intended. Furthermore, with grain not having the hulls removed, such as oats, rough rice, or the like, the moisture of the seed and the air will tend to thoroughly impregnate the hulls of the grain with an aqueous saline solution, and this saline solution penetrating through the hulls will destroy the germinating power of the seed, without adding any material portion of salt to the kernel of the seed, while the salt on the exterior of the hull will in a large measure prevent the development of germs tending to destroy or impair the grain.

I preferably apply the salt in the powdered form, and thoroughly mix the salt and the grain, which may be done by feeding the proper proportion of the salt to the grain in the conveyers, by which it is fed from the car or other conveyance to the grain receptacle, or the hold of the ship, or the like.

One advantage of the herein described process in treating grains with the hulls on, such as rough rice, oats, or the like, is that the salt and moisture cause the hulls to swell and draw away from the kernel, so that when the grain is dry the hull becomes a loose envelop on the kernel, like the dry pod of a pea, and may be much more easily separated from the kernel than in the practice now in use.

By the herein described process the grain is placed in such a condition that it will keep indefinitely.

It will be obvious that the grain may be treated either at the farm before being shipped, or preferably as it is supplied to the grain elevator, or to the hold of the ship, or it may be treated before being stored in sacks, or other receptacles, or in bulk in any suitable place of storage.

Having thus described my invention what I claim and desire to secure by Letters Patent of the United States is:—

1. The process of treating grain to sterilize and preserve the same, which consists in intimately mixing finely-divided chlorid of sodium with the grain, substantially as described.

2. The process of treating grain to sterilize and preserve the same, which consists in intimately mixing the grain with about 5% of its weight of finely-divided chlorid of sodium, substantially as described.

3. The process of treating grain having the hulls on to sterilize and preserve the same, which consists in intimately mixing finely-divided chlorid of sodium with the grain, substantially as described.

4. The process of treating grain having the hulls on for the purpose of sterilizing and preserving the same, which consists in intimately mixing the grain with about 5% of its weight of finely-divided chlorid of sodium, substantially as described.

In testimony whereof, I affix my signature, in presence of two witnesses.

EDWARD R. BARROW.

Witnesses:
ERNEST WILKINSON,
E. C. OWEN.